(12) United States Patent
Duxbury

(10) Patent No.: US 7,821,427 B2
(45) Date of Patent: Oct. 26, 2010

(54) DATA PROCESSING SYSTEM AND METHOD

(75) Inventor: Neil Duxbury, Westbury (GB)

(73) Assignee: Roke Manor Research Limited, Romsey (GB)

( * ) Notice: Subject to any disclaimer, the term of this patent is extended or adjusted under 35 U.S.C. 154(b) by 80 days.

(21) Appl. No.: 12/250,931

(22) Filed: Oct. 14, 2008

(65) Prior Publication Data
US 2009/0115646 A1 May 7, 2009

(30) Foreign Application Priority Data
Nov. 5, 2007 (GB) ................................. 0721648.4
May 2, 2008 (GB) ................................. 0807983.2

(51) Int. Cl.
*H03M 5/00* (2006.01)
(52) U.S. Cl. ........................................ 341/55; 382/232
(58) Field of Classification Search ............. 341/50–90; 382/232, 251
See application file for complete search history.

(56) References Cited

U.S. PATENT DOCUMENTS

| | | | | |
|---|---|---|---|---|
| 5,532,694 | A | | 7/1996 | Mayers et al. |
| 5,936,636 | A | * | 8/1999 | Gelfenbain .................. 345/467 |
| 6,005,504 | A | * | 12/1999 | Hirono ......................... 341/83 |
| 7,102,552 | B1 | * | 9/2006 | Archbold et al. ............... 341/87 |
| 7,155,063 | B2 | * | 12/2006 | Chiba .......................... 382/233 |
| 7,358,874 | B2 | * | 4/2008 | Archbold et al. ............ 341/106 |
| 7,616,138 | B2 | * | 11/2009 | Archbold et al. ............ 341/106 |
| 2003/0161538 | A1 | * | 8/2003 | Chiba .......................... 382/233 |
| 2006/0171599 | A1 | | 8/2006 | Fukuhara et al. |
| 2008/0065596 | A1 | | 3/2008 | Shadmon et al. |

OTHER PUBLICATIONS

Combined Search and Examination Report (five (5) pages).
Schneier, B., "Applied Cryptography", 1996, Wiley & Sons, pp. 215, pp. 320-321, pp. 237, pp. 189-190. XP-002521670.
European Search Report dated Mar. 30, 2009 (One (1) page).

* cited by examiner

*Primary Examiner*—Lam T Mai
(74) *Attorney, Agent, or Firm*—Crowell & Moring LLP

(57) ABSTRACT

A method of processing an encoded data stream comprises determining one or more data strings of interest; wherein the data string comprises a predetermined sequence of characters; encoding (3) the or each data string using the same encoding that was used to encode to the data stream; and searching (4) for the encoded data string in the encoded data stream.

19 Claims, 6 Drawing Sheets

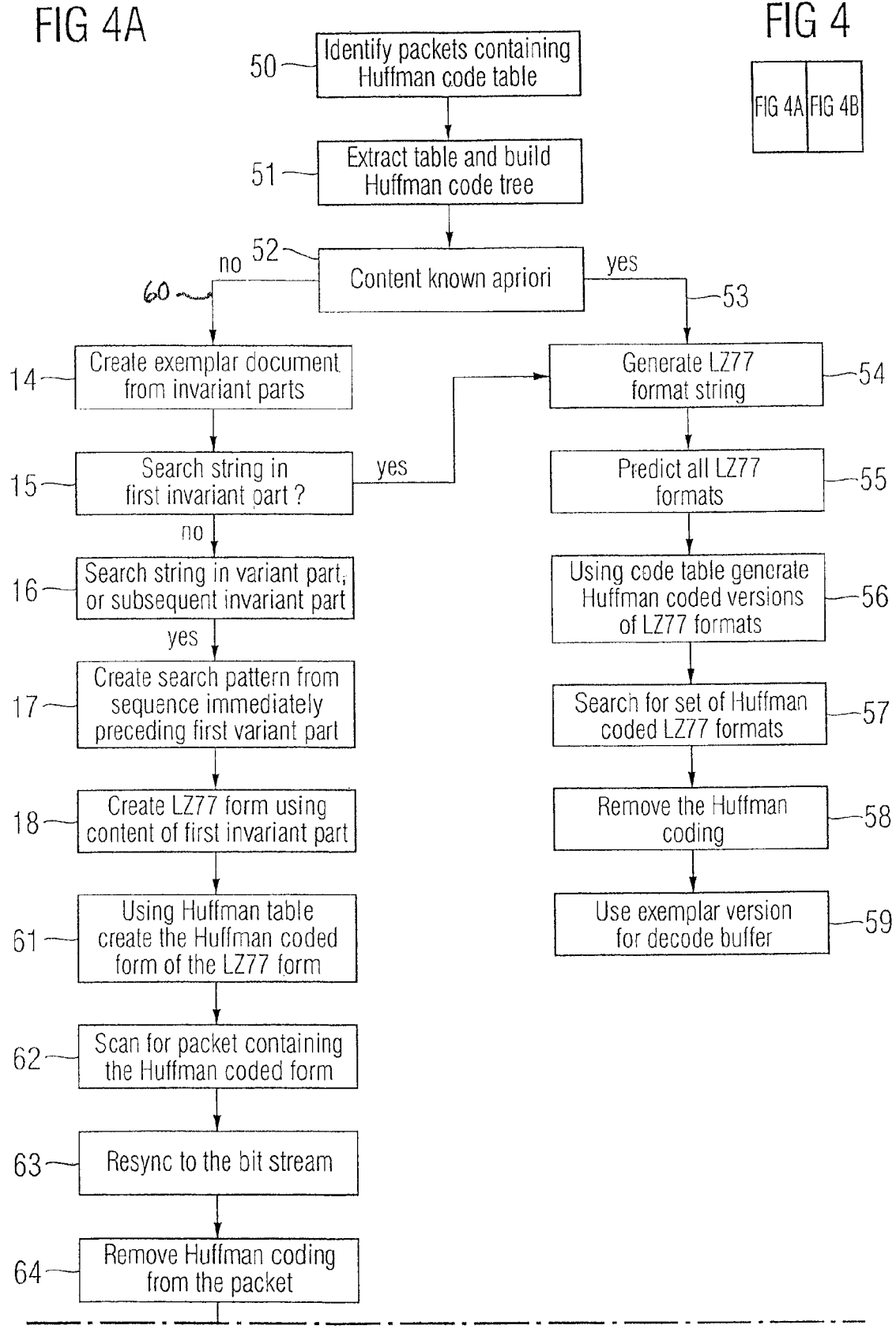

DATA PROCESSING SYSTEM AND METHOD

This invention relates to a method of processing an encoded data stream, in particular in the field of internet data processing systems.

BACKGROUND OF THE INVENTION

Data streams typically comprise files which are split into fragments called packets. In the example of internet based system, these packets are sent from one computer to another using transmission control protocol (TCP) sessions.

Data compression is a common method that is used to improve the performance of data transmission systems by decreasing the amount of data that needs to be transferred by reducing the redundancy within that data. Data encryption is also used within internet based, or other communications to secure data prior to transmission.

It is known to provide content scanning systems that search within packets of character data to identify one or more predetermined strings. A typical such system would be an email filtering system in which the string or strings being searched for are members of a predefined selection of banned words, such as swear words.

A problem with such systems is that their scanning capabilities are defeated when the data being scanned is encoded in some way, such as by compression or encryption. The act of compression, or encryption converts a sequence of characters into a different sequence of characters whose format is defined by the compression, or encryption algorithm used.

SUMMARY OF THE INVENTION

In accordance with a first aspect of the present invention, a method of processing an encoded data stream comprises determining one or more data strings of interest; wherein the data string comprises a predetermined sequence of characters; encoding the or each data string using the same encoding that was used to encode to the data stream; and searching for the encoded data string in the encoded data stream.

The invention avoids the need to decode the complete data stream in order to search for a particular string of interest by encoding the string of interest and searching for its encoded form.

Preferably, the searching comprises comparing the encoded data string with characters in a first section of the encoded data stream; and if the characters match, extracting the first section from the data stream.

Preferably, the number of characters in the first section is greater than the number of characters in the encoded data string.

The encoded characters which are searched for may act as an identifier for a larger section, which is then extracted.

Preferably, the encoding comprises at least one of compression and encryption.

Either one of the encoding types may be applied, or both together.

Preferably, the compression comprises at least one of a compression algorithm with dictionary encoding; or sliding window dictionary encoding.

Specific types of compression algorithm may be applied and if desired combined with encryption.

Preferably, the encoding of the, or each, data string comprises dynamic Huffman coding.

In this case, preferably, the method further comprises identifying packets in the encoded data stream which include a Huffman code table; extracting the Huffman code table; assembling a Huffman code tree from the extracted Huffman code table; and encoding the data string by constructing a bit sequence, representing the data string, using the Huffman code tree.

In one embodiment, the data stream contains fixed and variable data parts; wherein the data string of interest is dependent upon at least one variable data part; wherein an exemplar document is created from the fixed data parts; and wherein a search pattern is created from a fixed data part immediately preceding a variable data part.

Preferably, packets containing the search pattern are identified and the variable data part decoded using the packet containing the search pattern; and wherein the data string is extracted from the decoded variable data part.

Preferably, the variable data part is decoded using a combination of the exemplar document and the packet containing the search pattern.

Preferably, the decoded data is merged into the exemplar document; wherein a further representation of the data string is created from the merged document; and a further search is carried out in the next fixed data part.

Alternatively, the decoded data is merged into the exemplar document; wherein a different data string is created from the merged document; and a further search is carried out in the next fixed data part.

Preferably, the merging, creation and further search steps continue until the complete encoded data stream has been searched.

Preferably, an encrypted search pattern is created from a fixed data part and an encryption key.

Preferably, packets containing the encrypted search pattern are identified and decoded using the encryption key.

In accordance with a second aspect of the present invention, a data processing system comprises an input for an encoded data stream; an encoder for encoding a data string; wherein the data string comprises a predetermined sequence of characters; a comparator for comparing a section of the encoded data stream with the encoded data string; and a processor to extract sections of the encoded data stream when the comparator finds a match.

Preferably, the system further comprises a store for storing the extracted sections for further processing.

Preferably, the encoder comprises at least one of a sliding window dictionary encoder; a compression algorithm dictionary encoder; and an encryption device.

Preferably, the section comprises a transmission control protocol session.

Preferably, the data string comprises part of a data packet.

An example of a data processing system and a method of processing an encoded data stream will now be described with reference to the accompanying drawings in which:

Figure 1:
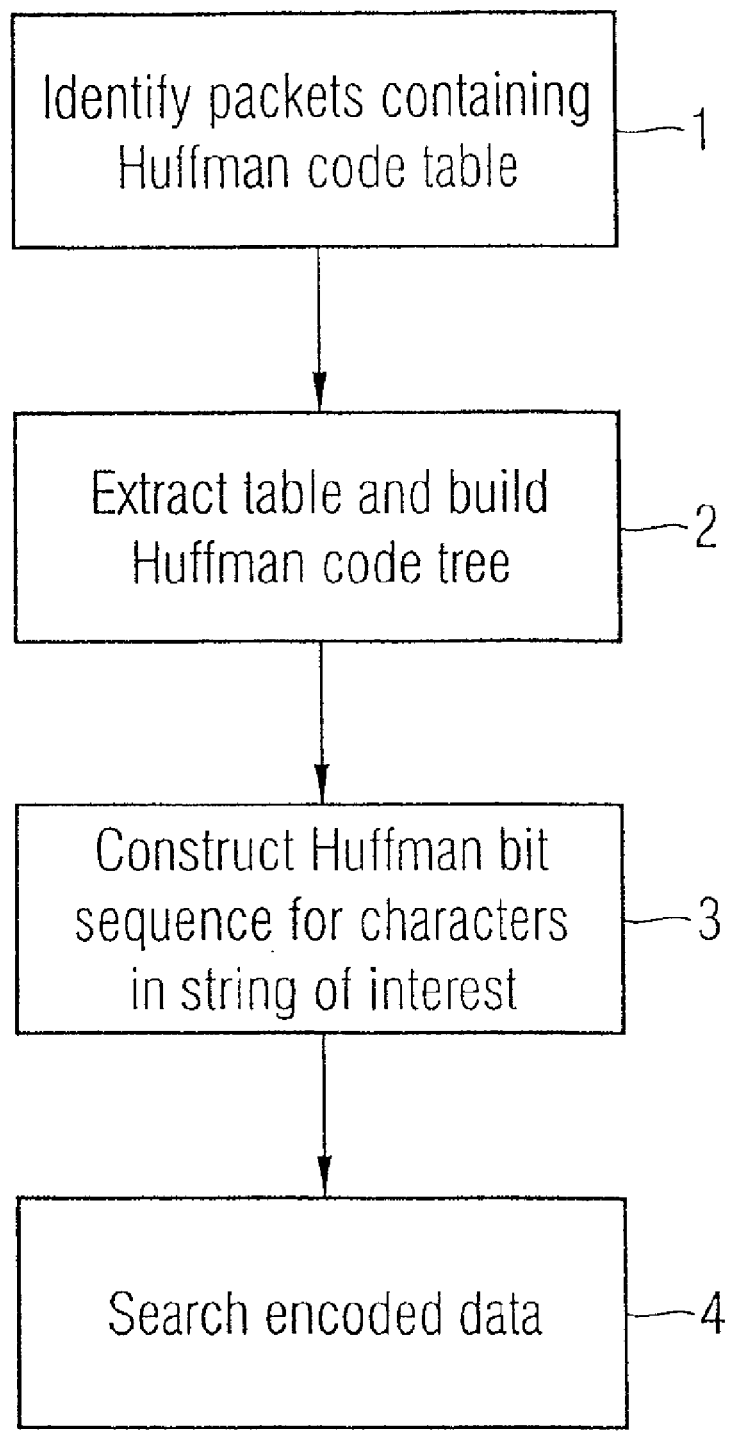
FIG. 1 illustrates an example showing the steps involved in applying the present invention to data encoded with dynamic Huffman coding.

Huffman coding is an entropy encoding algorithm used for lossless data compression. The coding uses a variable length code table for encoding a source symbol, such as a character in a file, where the variable length code table has been derived in a particular way based on the estimated probability of occurrence (or frequency) for each possible value of the source symbol. The frequencies used can be generic ones for the application domain that are based on average experience, or they can be the actual frequencies found in the text being compressed, which is known as dynamic Huffman.

To decode the compressed data, the code table is used to build a Huffman tree. Encoded symbols are then decoded by traversing the tree using the compressed data a bit at a time until the decoded symbol is found. The decoded symbol is then emitted by the decoder. When using dynamic Huffman coding the code table must be carried as part of the encoded data. This is usually done by prepending the code table to the file it was used to compress. This amalgamation is then packetised and transmitted.

LZ77 is a lossless data compression algorithm published in a paper by Abraham Lempel and Jacob Ziv in 1977. LZ77 algorithms achieve compression by replacing portions of the data with references to matching data that has already passed through the encoder/decoder. A match is encoded by a pair of numbers called a length-distance pair, which is equivalent to the statement "each of the next length characters is equal to the character exactly distance characters behind it in the uncompressed stream." When decoding the data, a history buffer of decoded symbols is required so that the length-distance pairs can be resolved to a character. This property of LZ77 causes a problem with packetised data in that, for an individual packet, the history required to interpret the length-distance pairs is not available. Consequently, in isolation a packet encoded with LZ77 cannot be decoded.

One of the most commonly used compression methods within internet communications is Deflate which is a combination of LZ77 and Huffman coding. First a file is compressed using LZ77 and a Huffman code table is then generated from the LZ77 symbols contained within the LZ77 compressed version of the file. The data is then further compressed with Huffman coding using the code table derived from the data. The code table is then attached to the compressed data and the result is packetised and transmitted over an internet session.

Encryption uses a secret key is used to encrypt a file using an encryption algorithm.

A simple method to handle this compressed, or encrypted data is as follows:

A. Collect all of the packets within a session carrying a compressed/encrypted file.

B. Reconstitute the file.

C. Decode the data.

D. Scan the original plaintext for instances of one or more search terms.

The processing load associated with decompressing or decrypting the data is high and the volumes of data needing to be checked, such as the volume of email traffic, is tending to increase at the same time as the number of strings that need to be checked is also increasing. These factors combine to disadvantageously increase the processing load associated with content scanning of this type. Measures that can address this problem are desirable.

The present invention searches for the occurrence of one or more strings, e.g. words, each formed of a predetermined sequence of characters within a sequence of character data which has been packetised and encoded, either by compression or encryption prior to transmission. Specifically, the invention is applied to transmission of a session over the internet. Within an arbitrary number of TCP sessions containing packetised compressed, or packetised encrypted data for any of a plurality of strings each formed from a predetermined sequence of characters, if a packet is found that contains one of these strings its associated session is selected and filtered off for further analysis. Sessions which are associated with packets that do not contain a string of interest are discarded.

In particular the present invention relates to the identification of predetermined string or set of strings within sessions whose packets have been compressed or encrypted using one or more of an entropy encoder, such as Huffman coding; a self referential compression algorithm such as LZ77; a combination of LZ77 and Huffman coding such as Deflate; or a session that has been encrypted using a known encryption algorithm.

There are various applications of the method of the present invention, for example searching for a username in data which is being transmitted, but which data has been encrypted. Decrypting the whole data stream to search for the one name is CPU intensive, but taking a string of interest, e.g. a username, using encryption keys to encrypt that string, then searching for a subset of the encrypted username in the encrypted data stream means that it is possible to only select the desired section containing this part and decrypt that section, or store it for further analysis, rather than decrypting the complete data stream, i.e. the encrypted fragments effectively carry out a pre-selection. If a user is able to start from a document having known content, which is encoded, either by compression, encryption, or both, then if the algorithm used to compress or encrypt is known, it is possible to find something from the original e.g. a page from a text book.

In the instance where dynamic Huffman codes are used to encode the data, a string of interest within a packet can be identified as follows, as illustrated in FIG. 1. First the packets containing the Huffman code table are identified 1, then the Huffman code table is extracted 2 and a Huffman code tree is built. The Huffman code tree is used to construct 3 a bit sequence that represents the sequence of Huffman codes defined by the characters in the search string. This bit pattern can then be used to search 4 the compressed data directly. If an instance of the bit sequence is found within the compressed data then a match has been found. This methodology can be generalised to a set of patterns by generating a bit sequence for each string within the set of patterns. The search is then generalised by searching for the set of bit sequences in the compressed data.

Figure 2:
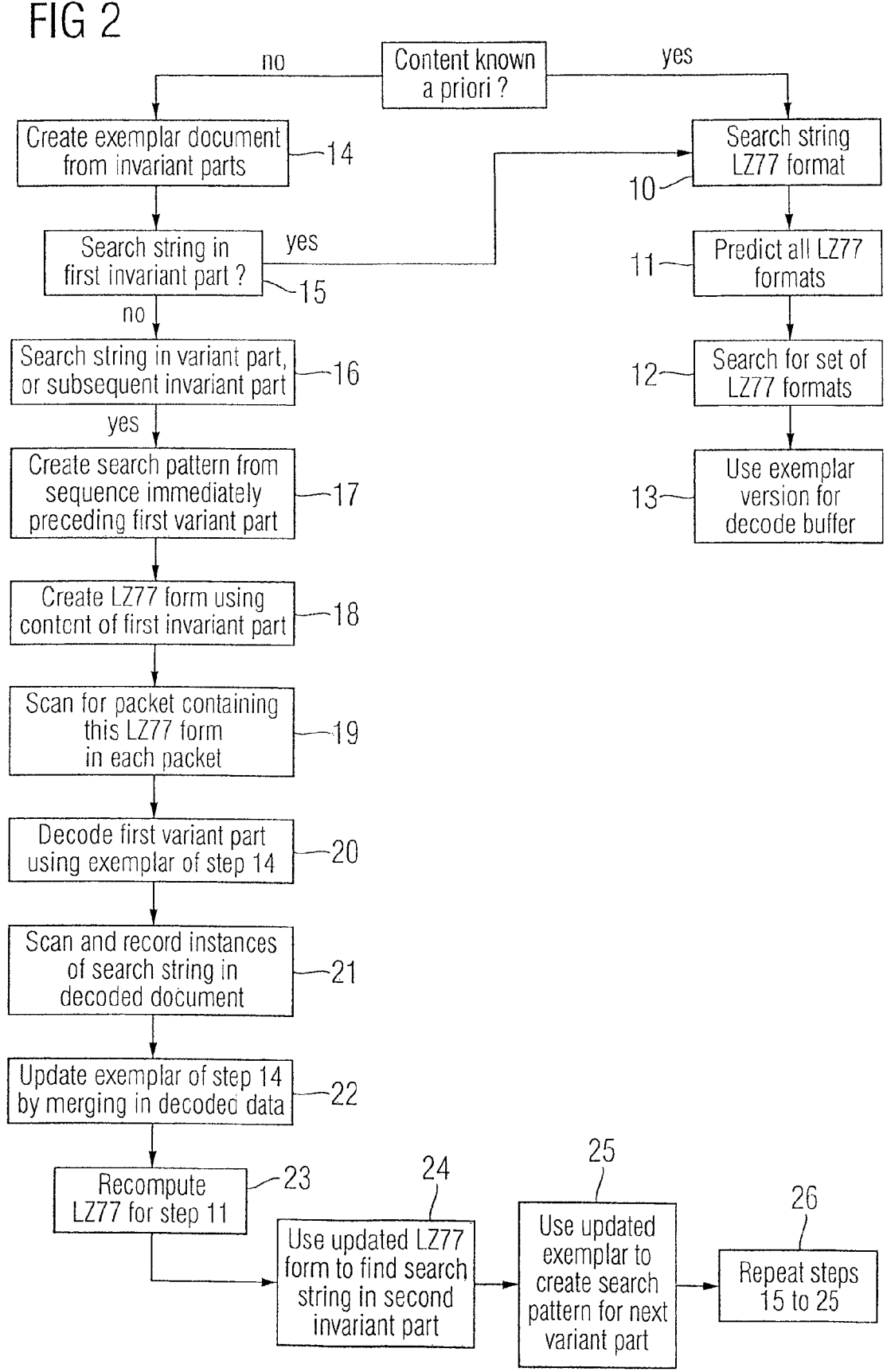
FIG. 2 illustrates an example showing the steps involved in applying the present invention to data encoded using an LZ77 algorithm.

In the instance where LZ77 is used to encode the data a string of interest within a packet can be identified by carrying out the following steps, as illustrated in FIG. 2:

If the contents of a document are known a priori to a search then instances of a string within the compressed packetised version of that document can be identified by representing the search string in the LZ77 format in which it will be present within the compressed form of the document (step 10).

Due to the properties of the LZ77 algorithm each instance of a search string will have a different format. However, as the original content of the document is known all these formats can be predicted by applying the LZ77 compression algorithm to the known document (step 11).

A packet containing an instance of a search string can be identified by searching for the set of LZ77 formats defined by compressing the known document using the LZ77 algorithm (step 12).

As stated previously, for an individual packet decompression is not possible as the decode buffer required for decoding the length-distance pairs is not available. However, if the contents of a document is known a priori to the search then the decode buffer can be provided by a copy, or exemplar of the known version. Thus, rather than use the length-distance pairs to find content in the decode buffer they instead are used to find content in the exemplar document (step 13). This step allows the data to be decoded on a per packet basis without the associated decode buffer.

However, when a document has varying content, e.g. an access log with a list of time stamps, then although it could be compressed or encrypted with a known algorithm, the actual content is not known, so this cannot be simply encoded and searched for. This is not such a problem if the algorithm is of a certain type, e.g. Huffman, i.e. a compression algorithm with a dictionary encoder, but it can be an issue with other types of encoding. If the dictionary, in this case the Huffman table, is known, then the search pattern can be encoded, either by compression, encryption, or both and the pattern searched for directly. A search is made for the whole pattern, which can be speeded up by doing a byte at a time pattern match, then addressing the remaining bits, rather than a bit at a time.

A further scenario is one in which data has a partly fixed, partly varying content, e.g. a webmail form. An example of such an application is collecting statistics on the number of users wanting to make particular train journeys, or demographic profiling in order to send targeted advertising. A third party could be looking at the data and adapting the adverts based on what journey information is requested by the user. The structure of the form which is visible is fixed in HTML, but the actual details entered are different for each user who completes the form. In this case, the known structure of the form can be used to predict where the varying data content occurs. The aim is to find the dynamic parts and resynchronise to the compression stream, then decode the data. All variable parts up to the part containing the predicted pattern within the data stream compressed file are decoded.

Figure 3:
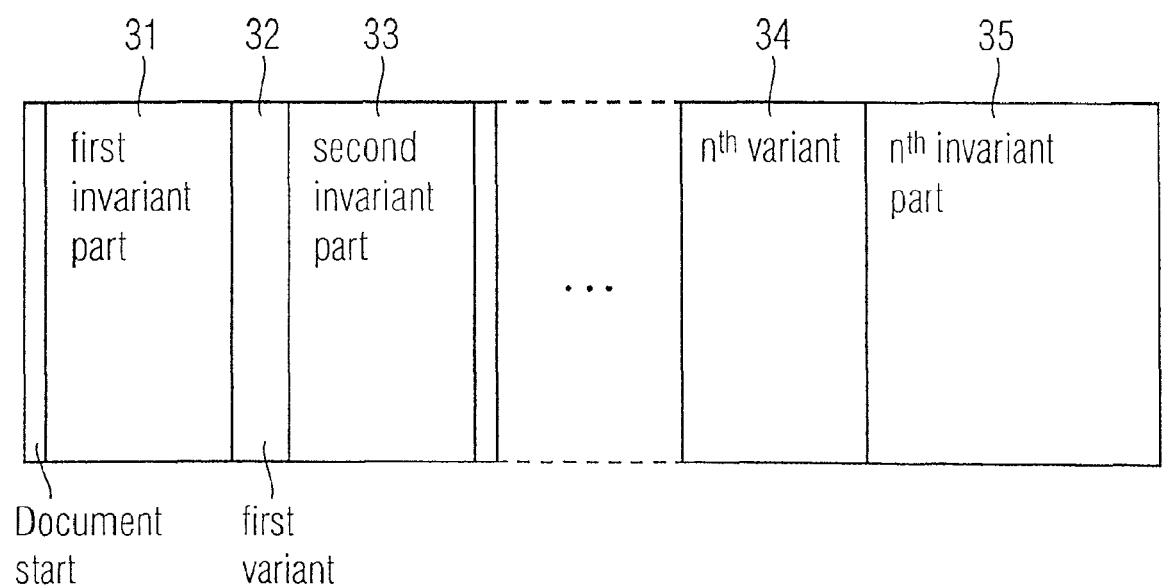
FIG. 3 illustrates how the present invention is applied to a data stream made up of both variant and invariant parts.

In the case where the content of a document is not known a priori to the search, for example, the user generated or variant content of an email message is not known before it is sent, there may be regions of the document that appear in every instance of a document of that type. For example, all emails have the same general structure and include regions of text that are common to all emails. In general a document can be viewed as a sequential series of invariant and variant (user generated) parts, as illustrated in FIG. 3.

The parts of the document that are known a priori to the search can be used to create an exemplar document (step 14). In this case the exemplar only contains the parts of the document that do not change due to user generated input, the invariant parts 31, 33, 35.

If a search string exists in a first invariant part 31 of the document (step 15), then a packet containing that string can be found and decompressed using the methodology of steps 10 to 13.

If the string to be found exists in one of the variant parts 32, 34 or within one of the invariant parts 33, 35 that lies beyond the first variant part 32 (step 10) then an instance of a search string can be found using the following methodology.

An exemplar document is created from the collection of invariant parts of a document as per step 14.

Using the exemplar document a search pattern is created from the sequence of characters that immediately precedes the first section of variant content (step 17).

The LZ77 form of this search pattern is then created using the contents of the first invariant part of the exemplar document (step 18).

The packet containing the LZ77 form of said search pattern is then identified by scanning for it in every packet (step 19).

Once this packet has been found the first variant part can be decompressed (step 20) using the contents of the exemplar document from step 14.

The decompressed data can then be scanned for instances of the search string. Any instances of the search string are then recorded (step 21).

The exemplar document is then updated by merging the decompressed data into it (step 22).

The LZ77 form(s) of the search string defined in step 11 are then recomputed for use in the second invariant section of the document (step 23). This allows the LZ77 form(s) of the search string defined in step 11 to be updated to take account of the user generated data contained in the first variant part of the document.

The updated LZ77 form(s) can then be used to find instances of search string in the second invariant part of the document (step 24). Any instances of the search string found are recorded.

The updated exemplar document is then used to create a search pattern (step 25) to find the next variant part of the document using similar methodology to step 18. Steps 16 to 24 are then repeated to find the subsequent instances of the search string in the document.

This process is repeated (step 26) until no data is left.

The advantage here is that the use of the exemplar document and the re-factoring of the search patterns means that the invariant parts of the data do not need to be decompressed. Consequently, it is possible to avoid decoding a large fraction of the packetised data and only decode those packets that contain the search strings of interest. This methodology can be generalised to a set of patterns by applying the methodology to the pattern set rather than just a single string.

Combining a method such as LZ77 with Huffman coding gives a higher compression ratio, but this makes it harder to find where to skip to. A Huffman data stream is bit aligned, so in order to decode the data at an arbitrary position in a compressed data stream it is necessary to find a way of re-synchronising at each point that is skipped to. In general, re-synchronisation can be achieved by creating a long bit sequence. This sequence can then be re-aligned to the bit stream at an arbitrary point by identifying sections whose bit sequence is the same as that of the test pattern. If the pattern is long enough then there will be an increasingly small probability of a mismatch. Once the data stream is synchronised, the data can be decoded in the normal way.

Figure 4B:
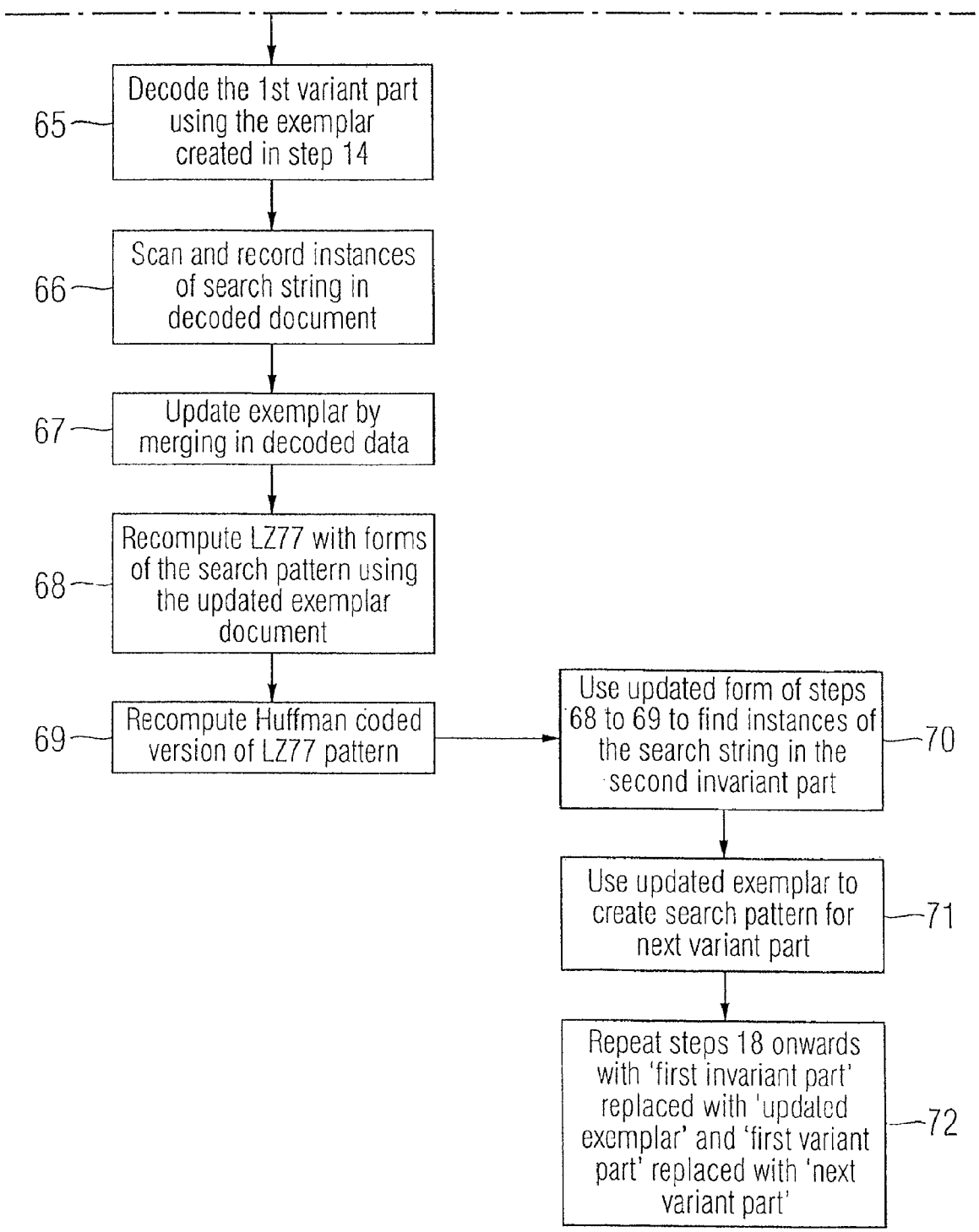
FIG. 4 illustrates how the present invention is applied to data encoded using a combination of LZ77 and Huffman coding; and, FIG. 5 illustrates the steps involved in applying the present invention to an encrypted data stream.
Figure 5:
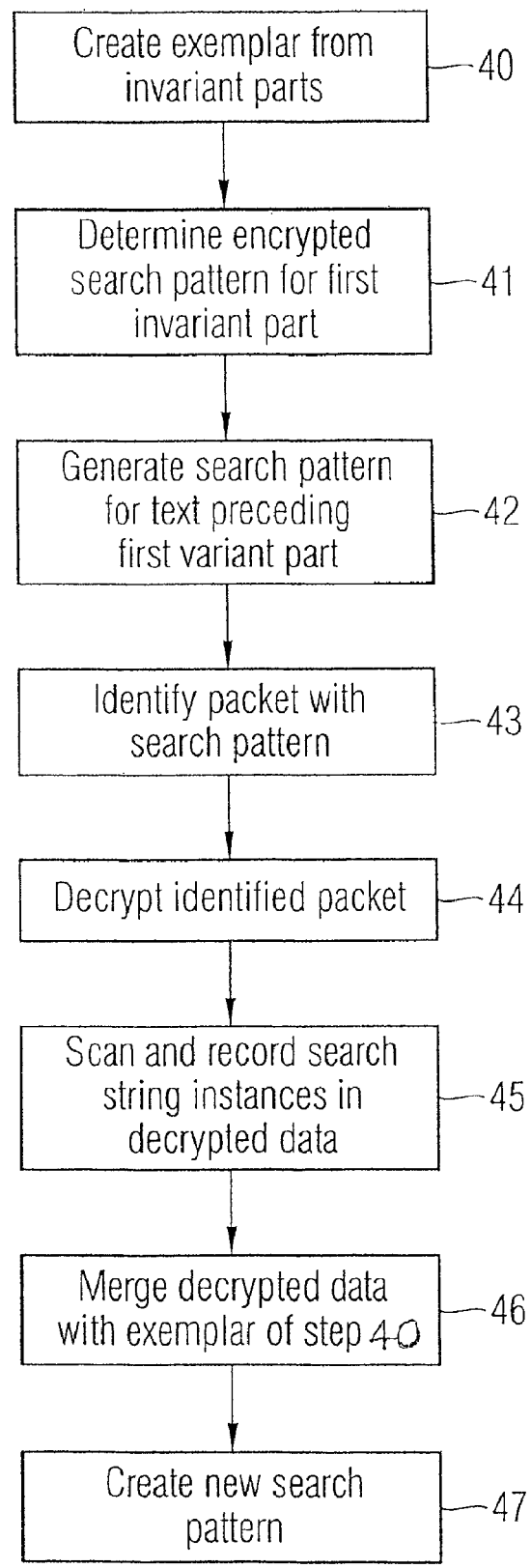

To handle Deflate encoding (a combination of LZ77 and Huffman coding) the methodology described for Huffman coding (FIG. 1) is applied to the patterns generated using the methodology for LZ77 (FIG. 2). This is illustrated in FIG. 4. First the packets containing the Huffman code table are identified (step 50), then the Huffman code table is extracted and built (step 51).

If the contents (step 52) of the document are known (step 53) a priori to a search then instances of a string within the compressed packetised version of that document can be identified by first representing (step 54) the string in the LZ77 format(s) in which it will be present within the compressed form of the document.

Due to the properties of the LZ77 algorithm each instance of a search string will have a different format. However, as the original content of the document is known all these formats can be predicted (step 55) by applying the LZ77 compression algorithm to the known document.

Once the set of LZ77 patterns have been devised the Huffman code table is used to convert (step 56) the set of LZ77 patterns into their Huffman encoded variants. A packet containing an instance of a search string can be identified by searching (step 57) for the set of Huffman encoded LZ77 formats defined by compressing the known document using the LZ77 algorithm.

When a Huffman encoded LZ77 pattern is found then the Huffman coding is removed (step 58) and then the LZ77 format is decoded (step 59) using the exemplar document based method described previously.

When a document has partly fixed and partly varying content, i.e. all the content is not known (step 60) a priori, a similar method to that used to handle the LZ77 format can be used. The method differs in that searches are made for the Huffman coded variants of the LZ77 patterns.

If the string exists in a first invariant part of the document then a packet containing that string can be found and decompressed using the methodology for a document where the content is known a priori (steps 54 to 59).

If the string to be found exists (step 16) in one of the variants parts 32, 34 or within one of the invariant parts 33, 35 that lies beyond the first variant part 32 then an instance of the string can be found using the following methodology.

As before, first the packets containing the Huffman code table are found (step 50) and the Huffman code table is built (step 51).

An exemplar document is then created (step 14) from the collection of invariant parts of the document. Using the exemplar a search pattern is created (step 17) from the sequence of characters that immediately precedes the first section of variant content.

The LZ77 form of this pattern is then created (step 18) using the contents of the first invariant part of the exemplar document.

The Huffman coded form of this LZ77 pattern is then created (step 61) using the Huffman code table.

The packet containing the Huffman coded LZ77 pattern is then identified (step 62) by scanning for it in every packet.

Once found the first variant part can be decompressed by re-synchronising (step 63) the Huffman pattern, decoding the Huffman (step 64) using the code table above and then decoding (step 65) the LZ77 using the exemplar document.

The decompressed data can then be scanned (step 66) for instances of the search string. Any instances of the search string are then recorded.

The exemplar document is then updated by merging (step 67) the decompressed data into it.

The LZ77 form(s) of the search string are then recomputed (step 68) with forms of the search pattern using the updated exemplar document, for use in the second invariant section of the document. This allows the LZ77 form(s) of the search string defined in the previous phase to be updated (step 69) by recomputing the Huffman coded version of the LZ77 pattern, to take account of the user generated data contained in the first variant part of the document.

The updated LZ77 form(s) of steps 68 to 69 can then be used (step 70) to find instances of the search string in the second invariant part of the document. Any instances of the search string found are recorded.

The updated exemplar document is then used (step 71) to create a search pattern to find the next variant part of the document using similar methodology to the previous phase. The method is then repeated to find the subsequent instances of the search string in the document.

This process is repeated (step 72) from step 18 onwards, with the "first invariant part" replaced with "updated exemplar" and with the "first variant part" replaced with "next variant part", until no data is left.

The process for handling encrypted content is similar to that used to handle LZ77 content. Assuming that the encryption key is available then for documents in which the content is known a priori to a search, an instance of a string within the encrypted packetised version of that document can be identified by creating a set of patterns representing the search string in its encrypted formats. Note there may be several such patterns in the encrypted content as the search string may be mixed with different sections of the text that surround it during the encryption process. This action will modify the exact sequence of bytes which are output by the encryption algorithm.

Packets containing the search string(s) can be found simply by scanning for the set of encrypted patterns defined by the text and the encryption key in use.

For encrypted documents which are a series of invariant and variant parts a similar methodology to that used for LZ77 can be adopted. In this case if the search string lies within a section of variant text then the encrypted version of that text cannot be determined a priori to the search. Similarly, if an instance of the search string lies on the edge of a variant section then the encrypted version of that text cannot be determined a priori to the search.

These difficulties can be overcome by identifying and decrypting the sections of variant content. The methodology to achieve this is equivalent to that described in steps 16 to 25 of the LZ77 methodology:

First an exemplar document is created from the invariant parts of the plaintext document (step 40).

The first invariant part of the exemplar document along with the encryption key is used to compute the format(s) of the encrypted search pattern within the first invariant part (step 41). Any instances of these patterns are then recorded by identifying them with the set of encrypted patterns.

The exemplar document is then used to generate a search pattern to identify the text preceding the first variant part (step 42).

The packet containing this pattern is then identified (step 43).

The packet identified in step 43 is decrypted using the encryption key (step 44).

The decrypted data in step 44 is scanned for the search string and any instances are recorded (step 45).

The decrypted data in step 44 is then merged with the exemplar document of step 40 (step 46) and the updated exemplar document is used to create new search patterns to facilitate the identification of the search string within the subsequent sections of the file (step 47).

The above steps are repeated until all of the data in the file has been covered. This methodology can be generalised to a set of patterns by applying the methodology to the pattern set rather than just a single string.

Features of specific embodiments of the present invention include the re-factoring of a search string, or set of strings using a Huffman code table derived from data in the string. Patterns derived in this way are used to search packetised data. An exemplar document is used to create a set of search patterns for a search string of interest and the set of patterns are used to identify packets of interest within a session containing encoded packetised data. The exemplar document is then used to decode the packets identified as being of interest.

In situations where documents being searched consist of both variant and invariant parts, an exemplar document is created from the collection of invariant data and used to create a search pattern for identification of a sequence of characters that occurs before a section of variant content. The pattern is then used to find the packets containing variant content. The decoded variant data is merged with the invariant data within the exemplar document and subsequently new search patterns are generated from the merged form of the exemplar document, then later data is decoded using the merged form of the exemplar document.

The present invention has been described with particular reference to Huffman coding and LZ77, but is equally applicable to other types of coding which follow a similar structure.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method of processing an encoded data stream, the method comprising:
   receiving said encoded data stream via an input;
   determining at least one data string comprising a predetermined sequence of characters of interest;
   using an encoder to encode the at least one data string via the same encoding that was used to encode to the data stream; and
   searching for the encoded data string in the encoded data stream; wherein,
   said searching step comprises using a comparator to compare the encoded data string with characters in a first section of the encoded data stream; and
   if the characters match, using a processor to extract the first section from the data stream.

2. The method according to claim 1, wherein the number of characters in the first section is greater than the number of characters in the encoded data string.

3. The method according to claim 1, wherein the encoding comprises at least one of compression and encryption.

4. The method according to claim 3, wherein the compression comprises at least one of a compression algorithm with dictionary encoding, and sliding window dictionary encoding.

5. The method according to claim 1, wherein the encoding of the, or each, data string comprises dynamic Huffman coding.

6. The method according to claim 5, further comprising:
   identifying packets in the encoded data stream which include a Huffman code table;
   extracting the Huffman code table; assembling a Huffman code tree from the extracted Huffman code table; and
   encoding the data string by constructing a bit sequence, representing the data string, using the Huffman code tree.

7. The method according to claim 1, wherein:
   the data stream contains fixed and variable data parts;
   the data string of interest is dependent upon at least one variable data part;
   an exemplar document is created from the fixed data parts; and
   a search pattern is created from a fixed data part immediately preceding a variable data part.

8. The method according to claim 7, wherein:
   packets containing the search pattern are identified and the variable data part decoded using the packet containing the search pattern; and
   the data string is extracted from the decoded variable data part.

9. The method according to claim 8, wherein the variable data part is decoded using a combination of the exemplar document and the packet containing the search pattern.

10. The method according to claim 8, wherein the decoded data is merged into the exemplar document; wherein a further representation of the data string is created from the merged document; and a further search is carried out in the next fixed data part.

11. The method according to claim 8, wherein the decoded data is merged into the exemplar document; wherein a different data string is created from the merged document; and a further search is carried out in the next fixed data part.

12. The method according to claim 10, wherein the merging, creation and further search steps continue until the complete encoded data stream has been searched.

13. The method according to claim 7, wherein an encrypted search pattern is created from a fixed data part and an encryption key.

14. The method according to claim 13, wherein packets containing the encrypted search pattern are identified and decoded using the encryption key.

15. A data processing system comprising an input for an encoded data stream; an encoder for encoding a data string; wherein the data string comprises a predetermined sequence of characters; a comparator for comparing a section of the encoded data stream with the encoded data string; and a processor to extract sections of the encoded data stream when the comparator finds a match.

16. The system according to claim 15, wherein the system further comprises a store for storing the extracted sections for further processing.

17. The system according to claim 15, wherein the encoder comprises at least one of a sliding window dictionary encoder; a compression algorithm dictionary encoder; and an encryption device.

18. The system according to claim 15, wherein the section comprises a transmission control protocol session.

19. The system according to claim 15, wherein the data string comprises part of a data packet.

* * * * *